United States Patent
Fujinaga

[11] Patent Number: 5,813,369
[45] Date of Patent: Sep. 29, 1998

[54] DEVICE FOR TAKING CARE OF A DOG'S DUNG

[76] Inventor: Jiro Fujinaga, 18-12 Aza-Hageyama Myohouji Suma-ku, Kobe-shi Hyogo, Japan

[21] Appl. No.: 888,922

[22] Filed: Jul. 7, 1997

[30] Foreign Application Priority Data

Sep. 5, 1996 [JP] Japan ................................. 8-257584

[51] Int. Cl.⁶ ................................................. A01K 23/00
[52] U.S. Cl. ............................................................ 119/868
[58] Field of Search ................................. 119/867, 868, 119/869

[56] References Cited

U.S. PATENT DOCUMENTS

| | | |
|---|---|---|
| 3,656,459 | 4/1972 | Missud . |
| 4,502,417 | 3/1985 | Jenkins . |
| 4,709,661 | 12/1987 | Mayler, Jr. ............................. 119/868 |
| 4,969,419 | 11/1990 | Fong ..................................... 119/868 |
| 5,355,836 | 10/1994 | Vallery .................................. 119/868 |
| 5,427,059 | 6/1995 | Logan .................................... 119/868 |

*Primary Examiner*—Thomas Price
*Attorney, Agent, or Firm*—Birch, Stewart, Kolasch & Birch, LLP

[57] ABSTRACT

A device, for taking care of a dog's dung simply and smartly while the dog is walked, includes a harness which can be mounted easily removably on a dog by being pushed from the dog's back onto the dog's waist or hips. A dung bag is fitted to the harness in such a manner that the bag faces the dog's anus. Therefore, the device is simple to mount on a dog and the dung is easily received by the bag.

10 Claims, 3 Drawing Sheets

DEVICE FOR TAKING CARE OF A DOG'S DUNG

FIELD OF THE INVENTION

The present invention relates to a device for taking care of a dog's dung in the field of breeding or keeping animals. In particular, the invention relates to a device for taking care of a dog's dung simply and smartly while the dog is walked.

BACKGROUND OF THE INVENTION

Conventionally, while people walk dogs, they carry vinyl bags, paper bags and/or the like for holding the dogs'dung so as to keep roads, parks and/or the like clean. It is, however, troublesome to carry vinyl bags, paper bags or the like. Besides, if a dog dungs, it is necessary to take care of the dung, taking much labor, and to walk with the bags or the like holding the dungs.

A number of devices have been suggested for taking care of dung. One of the devices includes a bar fitted with a tool for picking up a dog's dung, and with a bag on its one end for holding the dung. It is, however, still necessary to carry the device. Also, it takes much labor to pick up the dung and put it into the bag.

The applicant has developed a device for taking care of a dog's dung. The device includes a mounting member which can be fitted on a dog's waist or hips. A removable dung bag can be fitted to the mounting member in such a manner that it faces the dog's anus. It, however, takes much time and labor to fit the device on a dog.

SUMMARY OF THE INVENTION

In view of the foregoing points and in order to solve the foregoing problems, it is an object of the present invention to provide a useful device for taking care of a dog's dung. A device according to the invention comprises a harness which can be mounted easily removably on a dog by being pushed from the dog's back onto the dog's waist or hips. A dung bag can be fitted to the harness in such a manner that it faces the dog's anus. The harness may include a hold member which can be mounted on a dog's waist or hips. The hold member takes the form of an inverse U opening downward. The hold member may be fitted with metal for predetermined clamping force so as to be mounted on a dog's waist or hips from the dog's back and clamp the harness with predetermined elasticity. Therefore, the harness is simple to mount on a dog and easy to mount and remove.

It is another object of the invention to provide a device for taking care of a dog's dung and for fashionable mounting on a dog. This device comprises a piece of wear for covering a dog's back, waist and hips, and a hold member to which the piece is fitted so that a harness is mounted fashionably on a dog.

It is another object of the invention to provide a device for taking care of a dog's dung by receiving the dung securely in a bag while the dog is walked. This device comprises a harness and a hold member, one of which is fitted with a connector to a dog's collar so that the harness is not dislocated, but mounted securely in place on a dog.

It is another object of the invention to provide a device for taking care of a dog's dung and for easy mounting on a dog of any size. This device includes a hold member which can be mounted on a dog's waist or hips. The hold member is fitted with fasteners at regular intervals. A fitting member for fitting a dung bag can be fastened to the hold member by the fasteners in such a manner that its position can be varied.

It is another object of the invention to provide a device for taking care of a dog's dung and easily disposing of a dung bag. This device includes a mesh bag or another bag holder, by which a dung bag made of toilet paper can be fitted. The bag can be thrown away directly in a toilet.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

The invention will be described in detail with reference to the embodiments.

DETAILED DESCRIPTION OF THE INVENTION

A device according to the present invention for taking care of a dog's dung is characterized in that a harness can be mounted easily removably on a dog's back, waist or hips, and that the harness can be fitted with a dung bag in such a manner that the bag faces the dog's anus.

Figure 1:
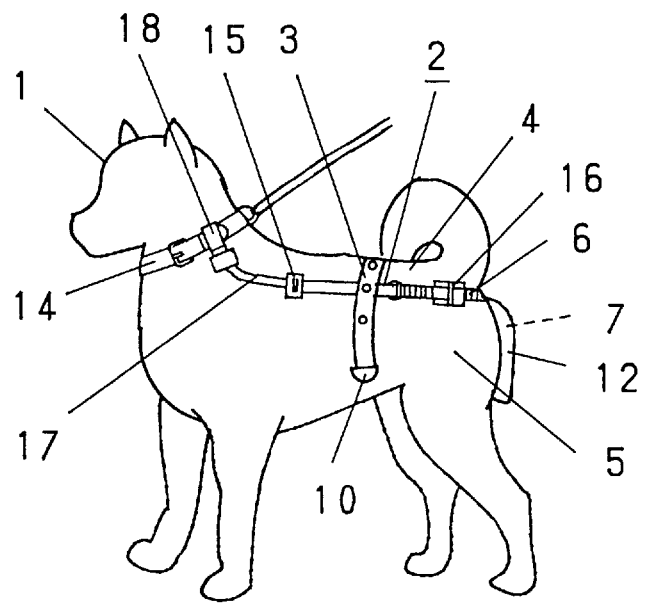
FIG. 1 shows a device, as fitted on a dog, according to an embodiment of the present invention for taking care of dung.

The harness 2 makes it possible to mount the dung bag 7 on a dog 1 by bending a hold member 3 of predetermined elasticity in the shape of an inverse U, mounting it on the dog's waist 4 or hips 5 as shown in FIG. 1, and fitting the hold member 3 with bag fitting members 6 of artificial leather, natural leather or the like in the form of straps, belts or the like.

Figure 2:
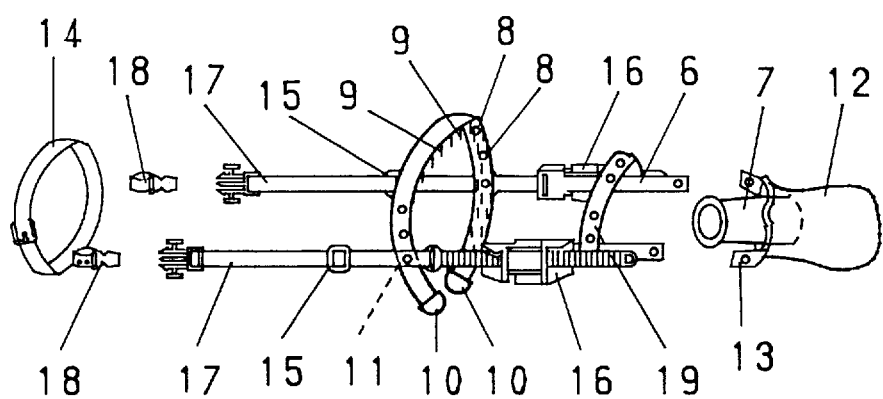
FIG. 2 is a perspective view of the device.

For adaptation to various sizes of dogs, the hold member 3 is 10–50 mm in width, and made of a little soft synthetic resin, into which metal may be inserted, so that the member 3 has predetermined elasticity. As shown in FIG. 2, the hold member 3 has eyelets, hooks or other fasteners 8 at regular intervals on both sides, with which the fitting members 6 can be fitted at a predetermined angle in such a manner that their position can be varied.

The hold member 3 has a number of pins, teeth or other protrusions 9 on its back side for secure engagement with the dog's waist 4 or hips 5. Both ends of the hold member 3 are fitted with soft covers 10 for soft mounting on the dog 1.

The fitting members 6 have eyelets, hooks or other fasteners 11, which can be connected to the fasteners 8 at a desired position (height). The rear ends of the fitting members 6 can support a dung bag holder 12 of predetermined size through eyelets, hooks, velvet fasteners or other fasteners 13 in such a manner that the holder 12 can be removed and faces the dog's anus. The bag 7 can be inserted into the holder 12, and its open end can be fixed with a fitting frame or the like so that it can securely hold the dog's dung in it.

The bag 7 may be made of cheap vinyl or other synthetic resin, or be a disposable bag like a paper diaper or a bag of toilet paper. As occasion demands, the bag may be fitted with fasteners or the like for direct fastening to the fitting members 6. It is preferable that the bag 7 be made of toilet paper, which can be thrown away directly in a toilet and is therefore easy to dispose of.

As shown in FIG. 1, the other ends of the fitting members 6 extend to the dog's neck, and can be connected removably to the dog's collar 14 so that the hold member 3 and the bag 7 are not dislocated.

Each fitting member 6 is fitted with length adjusters 15 and 16 adjacently to the collar 14 and the dog's hips 5, respectively, for fitting to various sizes of dogs.

As shown in FIG. 2, the front end of each connecting member 17 is fitted with a ring 18 for connection with the collar 14. It is therefore easy to mount the harness 2 on any dog 1 wearing a collar 14.

Figure 3:
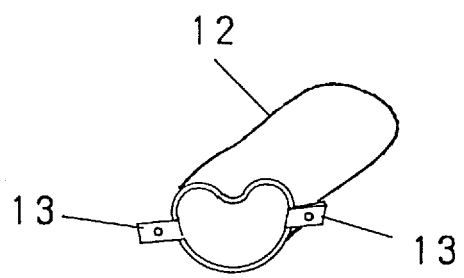
FIG. 3 is a perspective view of the dung bag holder of the device.
Figure 4:
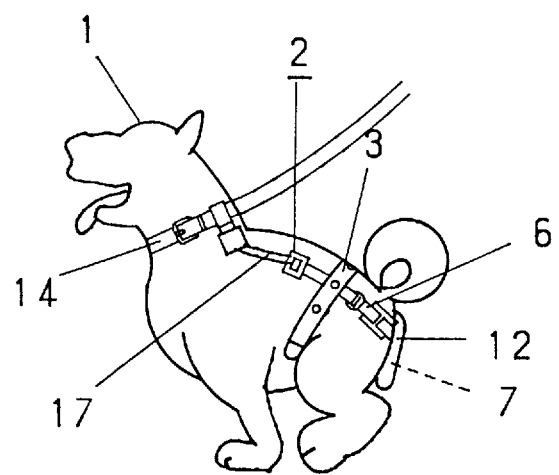
FIG. 4 is a side view of the device on a dunging dog.

FIGS. 1–4 show an embodiment of the present invention, in which the hold member 3 is 20 mm in width, made of synthetic resin and fitted with metal. The fitting frame of the bag holder 12 is about 100 mm in diameter. As shown in FIG. 3, this frame takes the form of a heart or the like with a top recess in the middle so as not to interfere with the tail of the dog 1.

As shown in FIG. 2, the fitting-members 6 are interconnected by a connector 19 a little above the position where the bag 7 is fitted. Consequently, the fitting members 6 can be mounted in place so that the bag holder 12 faces the dog's anus accurately.

When the device was mounted on a dog, it was easy to mount and remove because the hold member can be mounted on the dog's waist from the dog's back.

Because the harness can be connected to a dog's collar, it can be mounted without being dislocated, even if the dog moves around, so the objects of the invention can be achieved. Because the hold member has projections in the form of pins or teeth on its back side, it is possible to prevent the harness from being dislocated further.

When a dog wearing the device dungs during a walk, no dung is left on the ground. After the walk, it was possible to take out the dung bag and dispose of it. Therefore, it is no longer necessary to carry a vinyl bag, a paper bag or the like for taking care of dung while a dog is walked.

For adaptation to the size of a particular dog, it is possible to initially select the shape and/or the stop position of the length adjusters and/or the hold member so that the device can be mounted optimally on the dog.

Figure 5:
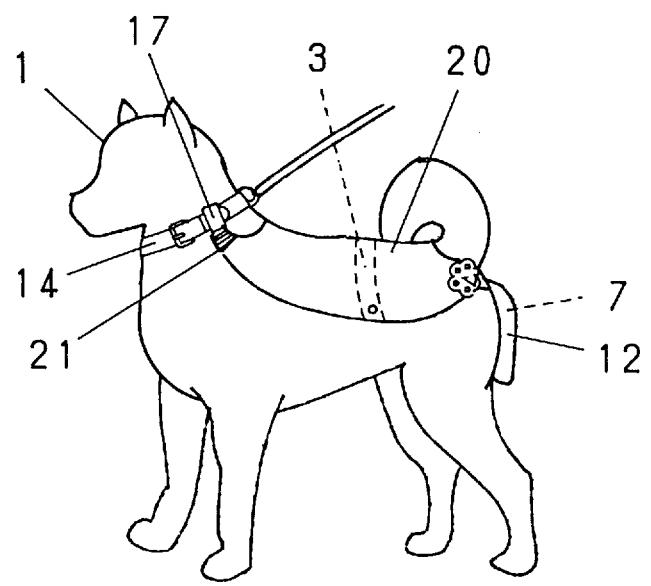
FIG. 5 shows a device, as fitted on a dog, according to another embodiment of the invention for taking care of dung.
Figure 6:
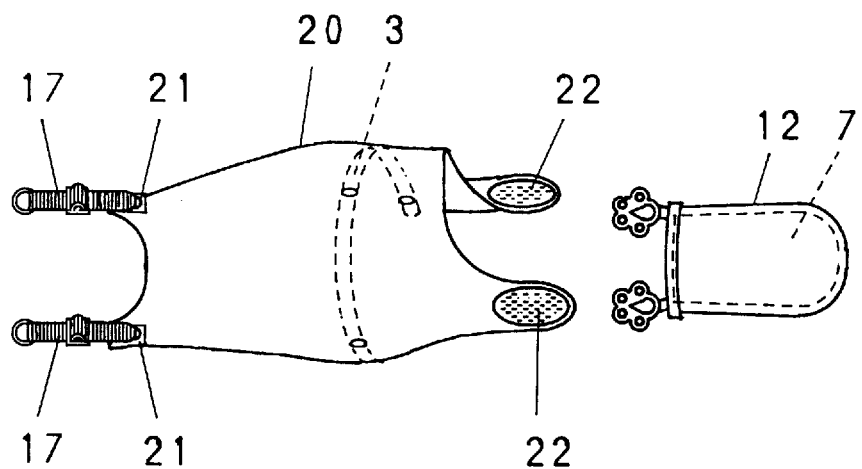
FIG. 6 is a perspective view of the ornamental or decorative covering of the device shown in FIG. 5.

FIGS. 5 and 6 show another embodiment of the present invention, in which the harness includes a piece of covering, or a cloak 20, which can be fitted on a dog's back and waist.

In this embodiment, a hold member 3 is fixed to a predetermined position on the back side of the cloak 20 with caulking means or the like. The front end of the cloak 20 is fitted with connectors 17 on its both sides for connection with a dog's collar 14. It is possible to adjust the length of each connector 17. The connectors 17 are connected to the cloak 20 removably by velvet fasteners 21. The rear end of the cloak 20 is fitted with velvet fasteners 22 on its both sides for removable connection with a bag holder 12.

The fasteners 22 are large in shape for adaptation to various sizes of dogs. It is possible to fasten the bag holder 12 to various places on the large fasteners 22.

Therefore, according to this embodiment, it is possible to mount the harness easily and fashionably on a dog. It is also possible to fit the harness fitly by varying the lengths of the connectors to a collar and/or the fastening positions of the fasteners for the sizes of dogs.

If the cloak is made of a waterproof sheet, it can be used as a raincoat, with which a dog can be walked in the rain.

Furthermore, if all or some portions of the cloak are made of mesh knitting, net knitting or lace-cloth, the cloak will keep the dog cool in the summer season.

By using the harness as a jacket, or a raincoat for a dog, it is possible to fit the jacket easily on a dog and walk the dog. When the dog dungs, it is possible to take care of the dung as stated above.

According to the present invention, as described hereinbefore, it is possible to mount the harness easily removably by pushing it from a dog's back onto the dog's waist or hips. It is also possible to fit the harness with the bag holder in such a manner that the holder faces the dog's anus. Therefore, the harness is simple to mount on a dog and easy to mount and remove, so the device is useful.

By fitting the hold member with the cloak for covering a dog's back and waist so as to mount the harness fashionably on a dog, it is possible to mount the device easily and fashionably on a dog.

By fitting the harness or the hold member with the connectors to a dog's collar, it is possible to mount the device securely in place on a dog. It is therefore possible to receive the dog's dung securely in the dung bag while the dog is walked.

For adaptation to different sizes of dogs, the hold member for mounting on a dog's waist or hips is fitted with the fasteners at regular intervals. The bag fitting members can be fastened to the fasteners at a desired position. By shaping the fitting frame of the bag holder like a heart or the like with a top recess in the middle, it is possible to size the holder to a dog's size so that the holder can be easily fitted and the bag can securely receive the dog's dung. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A device for taking care of a dog's dung comprising:
   a harness which can be mounted easily removably on a dog by being pushed from the dog's back onto the dog's waist or hips, the harness which can be mounted to a dog's waist or hips including a hold member, the hold member being shaped like an inverse U opening downward, the hold member being adapted to be mounted on a dog's waist or hips from the dog's back, the hold member having a predetermined clamping force for clamping with a predetermined elasticity, the hold member being fitted with a connector to a dog's collar, so that the harness is not dislocated; and
   a dung bag fitted to the harness in such a manner that the bag faces the dog's anus.

2. A device according to claim 1, wherein the harness further includes a piece of covering fastened to the hold member for covering a dog's back and waist so as to mount the harness fashionably on the dog.

3. A device according to claim 2, wherein a front end of the piece of covering is fitted with connectors, on sides thereof, for connection to a dog's collar, the connectors being adjustable in length and able to fix the piece of covering in such a manner that the piece of covering can be removed, a rear end of the piece of covering being fitted with velvet fasteners, on sides thereof, to which the dung bag is fastened removably.

4. A device according to claim 3, wherein the velvet fasteners are large in shape for adaptation to various sizes of dogs so as to fasten the dung bag thereto in such a manner that the position of the bag can be varied.

5. A device according to claim 2, wherein the piece of covering of the harness is made of a waterproof sheet.

6. A device according to claim 2, wherein all or some portions of the piece of covering of the harness are made of mesh knitting, net knitting or lace cloth.

7. A device according to claim 1, wherein the hold member is fitted with fasteners at regular intervals for adaptation to various sizes of dogs, the harness further including a fitting member for attaching the dung bag, the fitting member being fastened to the hold member by the fasteners in such a manner that its position can be varied.

8. A device according to claim 1, wherein the dung bag is made of toilet paper, the device further comprising a mesh bag or another bag holder for fitting the bag.

9. A device according to claim 1, wherein the back side of the hold member has protrusions in the form of pins or teeth for engagement with a dog's body.

10. A device according to claim 1, wherein both ends of the hold member are fitted with soft covers.

* * * * *